Patented Nov. 27, 1951

2,576,123

UNITED STATES PATENT OFFICE 2,576,123

NICKEL-CHROMIUM-IRON WELDING ELECTRODE

Theodore Ephraim Kihlgren, Berkeley Heights, N. J., and Joseph Sanson Bryner, State College, Pa., assignors to The International Nickel Company, Inc., New York, N. Y., a corporation of Delaware No Drawing. Application May 24, 1950, Serial No. 164,042

13 Claims. (Cl. 219—8)

The present invention relates to a nickel-base electric arc welding electrode and, more particularly, to a nickel-alloy welding electrode suitable for operation with either alternating or direct current and capable of producing ductile, single and multiple bead welds essentially free of hot cracking tendencies and capable of meeting exacting requirements as to freedom from weld porosity.

The present invention contemplates in its preferred form a nickel-base welding electrode containing columbium and silicon in a definite and predetermined relationship to each other so that the fusion metal of the weld produced will have a columbium-silicon ratio exceeding a certain critical minimum value and effective to eliminate the tendency to weld hot cracking. The novel electrode is provided with a special flux coating which offers important commercial and operational advantages over prior art electrodes with relation to reduction in tendency toward and elimination of weld porosity. The advantageous features of the present invention include a flux coating which is capable of being handled under normal drying procedure and of producing radiographically sound welds devoid of gas porosity and which is fairly insensitive to electrode drying procedure so as to eliminate the necessity of a special baking procedure, such as the prior high temperature bake.

We have discovered that the improved properties are obtainable with a novel electrode having a nickel-base core of the commercial 80%–14%–6% nickel-chromium-iron alloy and having a flux coating of a special lime-fluoride type containing a controlled carbonate content wherein the calcium carbonate content is employed below a certain critical level.

It is an object of the present invention to provide an electric arc welding electrode capable of producing sound welds devoid of gas porosity.

Another object of the invention is to provide an electric arc welding electrode suitable for operation in the production of sound welds with either alternating or direct current.

The invention also contemplates providing a nickel-base alloy welding electrode having a special lime-fluoride flux coating which has a controlled carbonate content and which is fairly insensitive to electrode drying procedure and effective in producing welds substantially free of gas porosity.

It is a further object of the invention to provide a nickel-base alloy welding electrode having a lime-fluoride type of flux coating containing a calcium carbonate content below a certain critical level and being substantially insensitive to drying procedure in the production of electrodes adapted to produce welds free of gas porosity.

The present invention also contemplates the provision of a flux-coated welding rod in which the flux is devoid of components and binder materials which may have a tendency to react with essential residual elements of the weld and thereby eliminate such essential residual elements from the fusion.

It is also a purpose of the invention to provide a flux devoid of ingredients which would introduce undesirable elements, such as lead and sulfur, into the fusion.

Other objects and advantages will become apparent from the following description of the invention and of illustrative examples thereof.

Nickel-chromium-iron alloys, such as commercial 80%–14%–6% nickel-chromium-iron alloys, generally contain small but highly important proportions of residual elements to insure hot and cold malleability. These residual elements also serve to "fix" deleterious impurities, such as sulfur, and render such deleterious impurities comparatively harmless. The electrode embodying the present invention operates to avoid loss of these essential residual constituents, both by providing a protective atmosphere about the arc and by avoiding the use of flux components and binders which may react with these essential elements and eliminate the latter from the fusion. Moreover, the use of flux ingredients which might introduce undesirable elements, such as lead and sulfur, is also avoided. In addition to the aforesaid essential residual elements, these nickel-chromium-iron alloys generally contain silicon as a minor constituent and it is usually impossible to obtain a nickel-chromium-iron alloy weld metal of zero silicon content. Furthermore, a small amount of silicon is always present in the flux ingredients.

It has been found that silicon whether added intentionally or concomitantly present tends to promote hot cracking in nickel-chromium-iron alloy welds, the severity of the cracking increasing with the silicon content. It has been further found that the addition of columbium to the fusion tends to counteract the deleterious effect of the silicon and that the hot cracking tendency of nickel-chromium alloys can be completely eliminated by the provision of a sufficient columbium-silicon ratio in the weld metal. The minimum columbium-silicon ratio required in the weld metal to eliminate hot cracking in alloys of the 80%–14%–6% nickel-chromium-iron type has been found to be 4.5 to 1 but in practice this ratio is desirably maintained at from 5 or 6 to 1 in order to provide a margin of safety.

In the preferred embodiment of the present invention, the columbium is introduced into the fusion entirely through the flux coating on the electrode core wire. The columbium may be introduced, however, partly through the flux coating and partly from a columbium content of the core wire, or it may be introduced from the core wire alone.

The electrode embodying the present invention not only maintains a columbium to silicon ratio required to effect the elimination of hot cracking but also provides ingredients in the flux coating which makes operation on A. C. as well as D. C. welding machines possible. This is accomplished by the use of a flux coating of a special lime-fluoride type with an addition of barium fluoride insuring good A. C. operability. The flux coating is of a controlled carbonate content below a certain critical level and effective in operation to produce welds substantially free of gas porosity. In the absence of barium fluoride the operability of the electrode, when using alternating current, would be unsatisfactory at the maximum permissible calcium carbonate levels. In addition to its effect upon the soundness of the welds, the flux coating is substantially insensitive to drying procedure thereby eliminating the necessity of high temperature baking which has been required heretofore in many instances.

Broadly stated, the present invention contemplates the provision of a nickel-base alloy welding rod having a special lime-fluoride type flux coating and having a calcium carbonate content below a controlled amount and effective to provide an electrode which does not require a high temperature baking treatment for the production of fusion welds which are free of objectionable gas porosity. The novel welding electrode made in accordance with the present discovery is capable of use in either alternating or direct current welding operations and comprises a core wire of nickel-base alloy, such as the commercial 80%–14%–6% nickel-chromium-iron alloy, provided with a lime fluoride type of flux coating having the composition and range set forth in Table 1.

TABLE 1

| Flux Composition | Parts by Weight | |
|---|---|---|
| | Preferred | Range |
| Calcium carbonate | 16 | up to 30 |
| Barium fluoride | 23 | 9 to 25 |
| Cryolite (Na₃AlF₆) | 22 | 10 to 50 |
| Ferro-50 columbium | 30 | up to 32 |
| Ferro-40 titanium | 6 | up to 12 |
| Bentonite | 3 | 2 to 5 |
| Dextrine | 3 | 1 to 5 |

The flux coatings are applied to core wires having the following preferred dimensions.

TABLE 2

| Core Wire | Coated Electrode |
|---|---|
| .075" Diameter | .110" outside Diameter. |
| .093" Diameter | .140" outside Diameter. |
| .125" Diameter | .190" outside Diameter. |
| .156" Diameter | .230" outside Diameter. |
| .187" Diameter | .260" outside Diameter. |

The core wire may also contain significant quantities of titanium and/or aluminum when these elements are desired in the fusion.

For the purpose of giving those skilled in the art a better understanding of the invention, the following illustrative examples are given.

*Example 1*

A test weld was made with the preferred embodiment of the invention. The core wire employed was of the preferred 80%–14%–6% nickel-chromium-iron alloy having the approximate analysis set forth in Table 3.

TABLE 3

Core Wire Composition

| Element | Per Cent |
|---|---|
| Carbon | 0.06 |
| Manganese | 0.25 |
| Sulfur | 0.008 |
| Silicon | 0.20 |
| Copper | 0.20 |
| Magnesium | 0.03 |
| Iron | 6.5 |
| Chromium | 14.0 |
| Nickel | 79.0 |

A ⅜" x 10" welded plate composed of members of an alloy corresponding to that of the core wire was made up using the electrode of the specified core material and provided with a flux coating having the preferred composition set forth in Table 4.

TABLE 4

| Flux Composition | Parts by Weight |
|---|---|
| Calcium Carbonate | 16 |
| Barium Fluoride | 23 |
| Cryolite (Na₃AlF₆) | 22 |
| Ferro-50 columbium | 30 |
| Ferro-40 titanium | 6 |
| Bentonite | 3 |
| Dextrine | 3 |

The weld produced was effected with several restrikes in each pass. The electrode employed was 3/32" diameter, .230" outside diameter, with the flux coating dried at 250° F., and the weldment was performed with the use of 120–130 ampere D. C. current. The resultant weld was free of porosity and entirely acceptable under exacting radiographic code requirements. The weld produced under the described conditions was cut into free bend specimens and was subjected to conventional free bend tests with results as follows:

Face bend 40%
Root bend 47%

The fusion metal in its analysis showed a silicon content of about 0.90% and a columbium content of about 4.50%, thus having a columbium to silicon ratio of about 5 to 1.

*Example 2*

An X-weld crack test was made with a weld specimen produced by a fusion deposit from an electrode having a core of the nickel-chromium-iron alloy of the composition given in Table 3 and having a flux coating of the preferred composition given in Table 1. The welded members were of nickel-chromium-iron alloy similar to that of the electrode core. In this test no cracking was observed either during the welding or after examination of polished and etched weld sections.

The effect of the controlled maximum carbonate content used in accordance with the present invention is demonstrated in Table 5 wherein comparative results are given with respect to weld porosity for separate welds of 80%-14%-6% nickel-chromium-iron members made with electrodes having cores of similar nickel-chromium-iron alloy composition but differing in their flux coatings, particularly with relation to the maximum carbonate content as specified in the following Table 5.

TABLE 5

| Flux Composition | Parts by Weight | | | |
| --- | --- | --- | --- | --- |
| | Weld No. 1 | Weld No. 2 | Weld No. 3 | Weld No. 4 |
| Calcium Carbonate | 16 | 20 | 25 | 30 |
| Barium Fluoride | 23 | 20 | 18 | 15 |
| Cryolite-native | 22 | 21 | 18 | 16 |
| Ferro-50 columbium | 30 | 30 | 30 | 30 |
| Ferro-40 titanium | 6 | 6 | 6 | 6 |
| Bentonite | 3 | 3 | 3 | 3 |
| Dextrine | 3 | 3 | 3 | 3 |
| Radiographic Examination Porosity | None | None | (¹) | (¹) |
| Calcium carbonate, per cent by weight of total weight of coated electrode | 4.7 | 5.8 | 7.3 | 8.8 |

¹ Slight at start.

It will be noted that the foregoing tests demonstrate that the maximum carbonate content of the coated electrode must not be more than about 9% of the weight of the coated electrode and preferably should be kept below about 6% of the weight of the coated electrode.

The novel electrode, accordingly, incorporates the principle that the maximum carbonate content of the flux must be held below a certain critical level if radiographic sound welds are to be obtained in the welding of 80%-14%-6% nickel-chromium-iron alloy used coated electrodes dried at the relatively low temperature of 250° F.-300° F.

Although the present invention has been described in conjunction with preferred embodiments, it is to be understood that modifications and variations may be resorted to without departing from the spirit and scope of the invention as those skilled in the art will readily understand. Thus, the nickel can be varied from about 75% to about 85%, the chromium from about 10% to about 16%, the iron from about 4% to about 10%, the carbon from about 0.01% to about 0.2%, the manganese from about 0.05% to about 1.0%, the silicon from about 0.05% to about 0.7% and the copper from about 0.05% to about 1.0%. Such modifications and variations are considered to be within the purview and scope of the invention and appended claims.

We claim:

1. A welding electrode adapted for forming weld deposits substantially devoid of gas porosity in A. C. or D. C. welding operations having a core wire of nickel-chromium-iron alloy with minor proportions of other alloying elements and a flux coating on the core wire, said flux coating containing 16 parts by weight of calcium carbonate, 23 parts of barium fluoride, 22 parts of cryolite, 30 parts of ferro-50 columbium, 6 parts of ferro-40 titanium, 3 parts of bentonite and 3 parts of dextrine.

2. A welding electrode adapted for forming weld deposits substantially devoid of gas porosity in A. C. or D. C. welding operations having a core wire of nickel-chromium-iron alloy with minor proportions of other alloying elements and a flux coating on the core wire, said flux coating containing calcium carbonate, 23 parts by weight of barium fluoride, 22 parts of cryolite, 30 parts of ferro-50 columbium, 6 parts of ferro-40 titanium, 3 parts of bentonite and 3 parts of dextrine and wherein the calcium carbonate content is not more than about 9% of the weight of the coated electrode.

3. An electric arc welding electrode adapted for forming weld deposits substantially devoid of gas porosity in A. C. or D. C. welding operations having a core wire of nickel-chromium-iron alloy with minor proportions of other alloying elements and a flux coating on the core wire, said flux coating containing calcium carbonate, 23 parts by weight of barium fluoride, 22 parts of cryolite, 30 parts of ferro-50 columbium, 6 parts of ferro-40 titanium, 3 parts of bentonite, and 3 parts of dextrine, the calcium carbonate content being less than about 6% of the weight of the coated electrode.

4. An electric arc welding electrode adapted for forming weld deposits substantially devoid of gas porosity in A. C. or D. C. welding operations having a core wire containing about 80% nickel, about 14% chromium, about 6% iron with minor proportions of other alloying elements, said core wire being provided with a flux coating, said flux coating containing up to about 30 parts by weight of calcium carbonate, from about 9 to about 25 parts of barium fluoride, from 10 to about 50 parts of cryolite, up to about 32 parts of ferro-50 columbium, up to about 12 parts of ferro-40 titanium, from about 2 to about 5 parts of bentonite, and from 1 to 5 parts of dextrine.

5. A welding electrode adapted for forming weld deposits substantially devoid of gas porosity in A. C. or D. C. welding operations comprising a nickel-base alloy core wire and a flux coating on the core wire, said flux coating containing up to 30 parts by weight of calcium carbonate, from 9 to 25 parts of barium fluoride, from 10 to 50 parts of cryolite, up to 32 parts of ferro-50 columbium, up to 12 parts of ferro-40 titanium, from 2 to 5 parts of bentonite and from 1 to 5 parts of dextrine.

6. A welding electrode adapted for forming weld deposits substantially devoid of gas porosity in A. C. or D. C. welding operations comprising a nickel-chromium-iron alloy core wire and a flux coating on the core wire, said flux coating containing up to about 30 parts by weight of calcium carbonate, from 9 to 25 parts of barium fluoride, from 10 to 50 parts of cryolite, up to about 32 parts of ferro-50 columbium, up to about 12 parts of ferro-40 titanium, from 2 to 5 parts of bentonite and from 1 to 5 parts of dextrine.

7. A welding electrode adapted for forming weld deposits substantially devoid of gas porosity in A. C. or D. C. welding operations comprising a core wire of nickel-chromium-iron alloy but including a minor proportion of silicon and a flux coating enclosing said core wire, said flux coating containing up to about 30 parts by weight of calcium carbonate, from 9 to 25 parts of barium fluoride, from 10 to 50 parts of cryolite, up to about 12 parts of ferro-40 titanium, from 2 to 5 parts of bentonite, from 1 to 5 parts of dextrine and containing columbium in such quantity and in such form that the residual columbium content in the fusion deposit from the electrode will be at least four and one-half times the residual content of silicon in the fusion deposit.

8. A welding electrode adapted for forming weld deposits substantially devoid of gas porosity in A. C. or D. C. welding operations having a core wire of nickel-chromium-iron alloy but including a minor proportion of silicon and a flux coating enclosing said core wire, said flux coating containing up to about 30 parts by weight of calcium carbonate, from 9 to 25 parts of barium fluoride, from 10 to 50 parts of cryolite, up to about 12 parts of ferro-40 titanium, from 2 to 5 parts of bentonite, from 1 to 5 parts of dextrine and said electrode containing columbium in such quantity and in such form that the residual columbium content in the fusion deposit from the electrode will be at least four and one-half times the residual content of silicon in the fusion deposit.

9. A welding electrode adapted for forming weld deposits substantially devoid of gas porosity in A. C. or D. C. welding operations having a core wire of nickel-chromium-iron alloy with minor proportions of other alloying elements and a flux coating on the core wire, said flux coating containing calcium carbonate, about 23 parts by weight of barium fluoride, about 22 parts of cryolite, about 6 parts of ferro-40 titanium, about 3 parts of bentonite and 3 parts of dextrine and wherein the calcium carbonate content does not exceed 9% of the coated electrode and said coated electrode having a columbium content in an amount equivalent to about 30 parts of ferro-50 columbium addition to the coating.

10. As a new composition of matter, a flux coating adapted for use on A. C. or D. C. nickel-chromium-iron alloy arc welding rods, containing by weight up to 30 parts of calcium carbonate, from about 9 to 25 parts of barium fluoride, from about 10 to 50 parts of cryolite, up to about 16 parts of columbium as ferro-columbium, up to about 4.8 parts of titanium as ferro titanium, from about 2 to about 5 parts of bentonite and from about 1 to about 5 parts of dextrine.

11. As a new composition of matter, a flux coating adapted for use on A. C. or D. C. nickel-chromium-iron alloy arc welding rods, containing by weight up to 30 parts of calcium carbonate, from about 9 to 25 parts of barium fluoride, from about 10 to 25 parts of cryolite, up to about 16 parts of columbium, up to about 4.8 parts of titanium, from about 2 to about 5 parts of bentonite and from about 1 to about 5 parts of dextrine.

12. As a new composition of matter, a flux coating adapted for use on A. C. or D. C. nickel-chromium-iron alloy arc welding rods, containing by weight up to 30 parts of calcium carbonate, from 9 to 25 parts of barium fluoride, from 10 to 50 parts of cryolite, up to 32 parts of ferro-50 columbium, up to 12 parts of ferro-40 titanium, from 2 to 5 parts of bentonite and from 1 to 5 parts of dextrine.

13. As a new composition of matter, a flux coating adapted for use on A. C. or D. C. nickel-chromium-iron alloy arc welding rods, containing by weight about 16 parts of calcium carbonate, about 23 parts of barium fluoride, about 22 parts of cryolite, about 30 parts of ferro-50 columbium, about 6 parts of ferro-40 titanium, about 3 parts of bentonite and about 3 parts of dextrine.

THEODORE EPHRAIM KIHLGREN.
JOSEPH SANSON BRYNER.

REFERENCES CITED

The following references are of record in the file of this patent:

UNITED STATES PATENTS

| Number | Name | Date |
|---|---|---|
| 1,974,732 | Andren | Sept. 25, 1934 |
| 2,435,504 | Mathias | Feb. 3, 1948 |
| 2,512,430 | Kihlgren | June 20, 1950 |
| 2,520,806 | Kihlgren et al. | Aug. 29, 1950 |